US012675768B2

(12) United States Patent
Nitta et al.

(10) Patent No.: US 12,675,768 B2
(45) Date of Patent: Jul. 7, 2026

(54) INFORMATION PROCESSING DEVICE, INFORMATION PROCESSING METHOD, AND INFORMATION PROCESSING SYSTEM

(71) Applicant: TOYOTA JIDOSHA KABUSHIKI KAISHA, Toyota (JP)

(72) Inventors: Iwao Nitta, Nagoya (JP); Teruyoshi Fujiwara, Toyota (JP); Ryota Suzuki, Ikeda (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 148 days.

(21) Appl. No.: 18/584,162

(22) Filed: Feb. 22, 2024

(65) Prior Publication Data

US 2024/0330850 A1      Oct. 3, 2024

(30) Foreign Application Priority Data

Mar. 31, 2023      (JP) ................................ 2023-058176

(51) Int. Cl.
  G06Q 10/087          (2023.01)
(52) U.S. Cl.
  CPC ................................. G06Q 10/087 (2013.01)
(58) Field of Classification Search
  CPC .. G06Q 10/087; G06Q 50/04; G06Q 10/0833; G06Q 10/08833

USPC .......................................................... 705/28
See application file for complete search history.

(56) References Cited

U.S. PATENT DOCUMENTS

2021/0342957 A1 * 11/2021 Small ................. G06Q 30/0185
2025/0132404 A1 *  4/2025 Schwabe ............ G06Q 10/0631

FOREIGN PATENT DOCUMENTS

JP          2004-171146  A       6/2004
WO        2019/125439  A1      6/2019

* cited by examiner

*Primary Examiner* — Ariel J Yu
*Assistant Examiner* — Denisse Y Ortiz Roman
(74) *Attorney, Agent, or Firm* — Oliff PLC

(57)          ABSTRACT

When an unregistered product that is an incorporated product for which information on a predetermined traceability item is not registered in product information stored in a storage device is present, an information processing device identifies a second supplier positioned immediately downstream of a first supplier of the unregistered product in a supply chain defined by a plurality of suppliers. The information processing device notifies the second supplier to request the first supplier to register the information on the predetermined traceability item about the unregistered product in the product information.

9 Claims, 10 Drawing Sheets

SERVER
DEVICE
1

2 2 2 2

COMPANY
TERMINAL

COMPANY
TERMINAL

COMPANY
TERMINAL

COMPANY
TERMINAL

OEM COMPANY
(Tier0)

COMPANY A
(Tier1)

COMPANY B
(Tier2)

COMPANY C
(Tier3)

DELIVERY DELIVERY DELIVERY

DOWNSTREAM UPSTREAM

FIG. 2

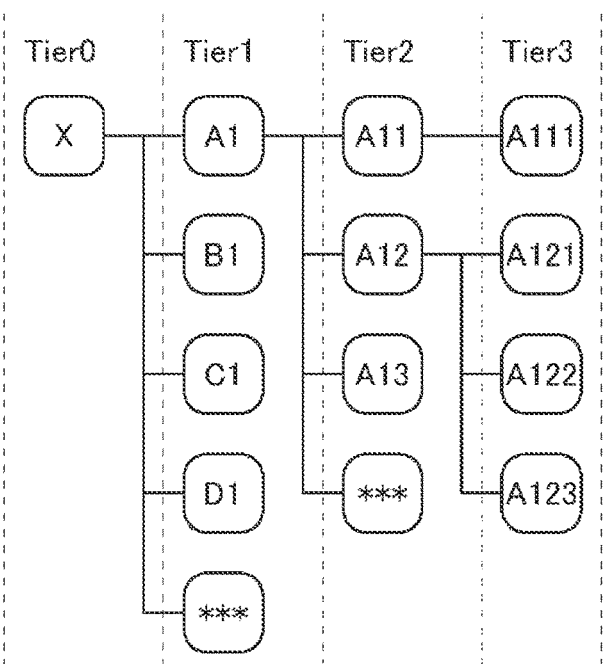

| Tier0 | Tier1 | Tier2 | Tier3 |
|-------|-------|-------|-------|
| X | A1 | A11 | A111 |
|  | B1 | A12 | A121 |
|  | C1 | A13 | A122 |
|  | D1 | *** | A123 |
|  | *** |  |  |

FIG. 3

SERVER DEVICE

PRODUCT INFORMATION A

PRODUCT INFORMATION B

PRODUCT INFORMATION C

IV. GENERATE PRODUCT TREE BY LINKING PIECES OF PRODUCT INFORMATION BASED ON LINKING INFORMATION

I. TRANSMIT INFORMATION ON PRODUCT MANUFACTURED IN-HOUSE (COMPONENT INFORMATION)

III. TRANSMIT LINKING REQUEST AND SELECT PRODUCT TO BE LINKED TO IN-HOUSE PRODUCT FROM AMONG PRODUCTS TO WHICH ACCESS IS PERMITTED BY UPSTREAM COMPANY

II. TRANSMIT INFORMATION INDICATING THAT DOWNSTREAM COMPANY IS PERMITTED TO ACCESS IN-HOUSE PRODUCT INFORMATION (PERMISSION INFORMATION)

COMPANY TERMINAL

PRODUCT INFORMATION A

COMPANY TERMINAL

PRODUCT INFORMATION B

PERMISSION INFORMATION

COMPANY A THAT PRODUCES DOWNSTREAM PRODUCT A (Tier N)

COMPANY B THAT PRODUCES UPSTREAM PRODUCT B (Tier N+1)

DOWNSTREAM ⟵                    ⟵ UPSTREAM

FIG. 8

| COMPANY ID | | C001 |
|---|---|---|
| COMPANY NAME | | COMPANY A |
| PRODUCT ID | | P001 |
| PRODUCT NAME | | PRODUCT A |
| LINKING-RELATED INFORMATION | UPSTREAM PRODUCT INFORMATION | (UNLINKED) |
| | TERMINATION FLAG | (UNSET) |
| TRACEABILITY-RELATED INFORMATION | MATERIAL USE AMOUNT (LITHIUM) | X[g] |
| | MATERIAL USE AMOUNT (NICKEL) | X[g] |
| | MATERIAL USE AMOUNT (COBALT) | X[g] |
| | MATERIAL USE AMOUNT (LEAD) | X[g] |
| | $CO_2$ EMISSION AMOUNT DURING PRODUCTION | X[g] |
| | DD INFORMATION | *** |
| *** | *** | *** |

FIG. 12

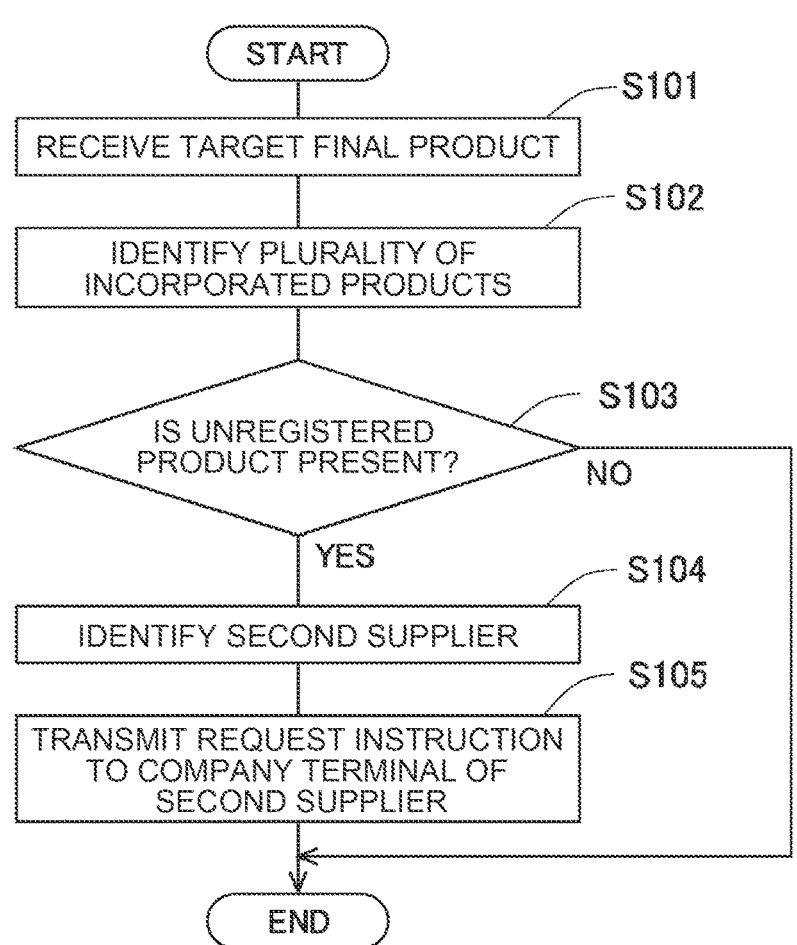

START

RECEIVE TARGET FINAL PRODUCT — S101

IDENTIFY PLURALITY OF INCORPORATED PRODUCTS — S102

IS UNREGISTERED PRODUCT PRESENT? — S103
NO
YES

IDENTIFY SECOND SUPPLIER — S104

TRANSMIT REQUEST INSTRUCTION TO COMPANY TERMINAL OF SECOND SUPPLIER — S105

END

FIG. 13

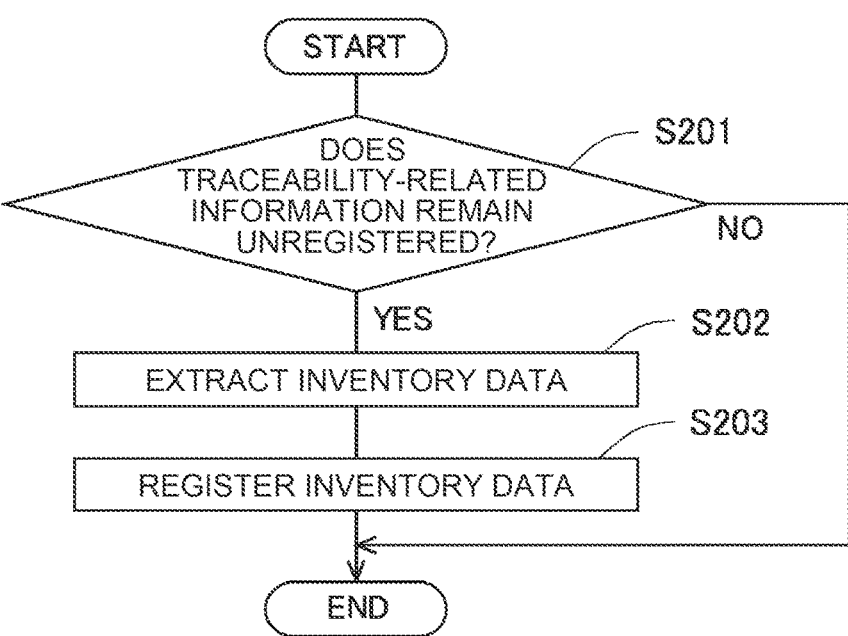

START

DOES TRACEABILITY-RELATED INFORMATION REMAIN UNREGISTERED? — S201
NO
YES

EXTRACT INVENTORY DATA — S202

REGISTER INVENTORY DATA — S203

END

INFORMATION PROCESSING DEVICE, INFORMATION PROCESSING METHOD, AND INFORMATION PROCESSING SYSTEM

CROSS-REFERENCE TO RELATED APPLICATION

This application claims priority to Japanese Patent Application No. 2023-058176 filed on Mar. 31, 2023, incorporated herein by reference in its entirety.

BACKGROUND

1. Technical Field

The present disclosure relates to an information processing device, an information processing method, and an information processing system.

2. Description of Related Art

Japanese Unexamined Patent Application Publication No. 2004-171146 (JP 2004-171146 A) discloses a system for managing data between a plurality of companies constituting a supply chain. In the system disclosed in JP 2004-171146 A, a management server connected to each company via a communication line includes a transaction product database. The transaction product database stores product information associated with a product for which a contract has been concluded between a vendor company and a customer company.

SUMMARY

The present disclosure provides a technology that can facilitate collection of pieces of information on a predetermined traceability item about a plurality of incorporated products incorporated in a target product.

An information processing device according to a first aspect of the present disclosure includes a storage device configured to store pieces of product information on a plurality of incorporated products incorporated in a target product, and a control unit. The product information is registered by a supplier of each of the incorporated products. The control unit is configured to: when an unregistered product that is an incorporated product for which information on a predetermined traceability item is not registered in the product information stored in the storage device is present, identify a second supplier positioned immediately downstream of a first supplier of the unregistered product in a supply chain defined by a plurality of the suppliers; and notify the second supplier to request the first supplier to register the information on the predetermined traceability item about the unregistered product in the product information.

In the information processing device, the control unit may be configured to register, in the product information, inventory data serving as a substitute for the information on the predetermined traceability item about the unregistered product when the information on the predetermined traceability item about the unregistered product is not registered in the product information after the second supplier has requested the first supplier to register the information on the predetermined traceability item about the unregistered product in the product information in response to notification sent to the second supplier.

In the information processing device, the information on the predetermined traceability item may include first information and second information. The first information may be information obtained from a result of measurement performed by each supplier in-house about the predetermined traceability item. The second information may be information on an amount of use in an in-house product of each supplier about a product supplied from another supplier positioned immediately upstream of each supplier.

In the information processing device, the control unit may be configured to, when the unregistered product is an incorporated product for which the second information is not registered in the product information, notify the second supplier about an instruction to request the first supplier to register the second information in the product information.

In the information processing device, the control unit may be configured to, when the unregistered product is an incorporated product for which the second information is registered and the first information is not registered in the product information, notify the second supplier about an instruction to request the first supplier to register, in the product information, the first information or inventory data serving as a substitute for the first information.

In the information processing device, the control unit may be configured to register, in the product information, the inventory data serving as the substitute for the first information when the first information or the inventory data serving as the substitute for the first information is not registered in the product information after the second supplier has requested the first supplier to register the first information or the inventory data serving as the substitute for the first information in the product information in response to notification sent to the second supplier.

In the information processing device, the control unit may be configured to acquire information on a product tree indicating relationships among the incorporated products incorporated in the target product. The control unit may be configured to identify the second supplier by referring to the information on the product tree.

In the information processing device, the storage device may include a first storage unit configured to store the product information on each of the incorporated products, and a second storage unit configured to store, for each of the incorporated products, inventory data serving as a substitute for the information on the predetermined traceability item of each of the incorporated products. The control unit may be configured to, when registering, in the product information stored in the first storage unit, the inventory data serving as the substitute for the information on the predetermined traceability item of the unregistered product, acquire the inventory data associated with the unregistered product from the second storage unit.

In the information processing device, the predetermined traceability item may include a carbon footprint of products, a recycling rate related to a predetermined raw material, or a score related to due diligence.

An information processing method according to a second aspect of the present disclosure is executed by an information processing device including a storage device configured to store pieces of product information on a plurality of incorporated products incorporated in a target product. The product information is registered by a supplier of each of the incorporated products. The information processing method includes: identifying, when an unregistered product that is an incorporated product for which information on a predetermined traceability item is not registered in the product information stored in the storage device is present, a second supplier positioned immediately downstream of a first supplier of the unregistered product in a supply chain defined by a plurality of the suppliers; and notifying the second supplier to request the first supplier to register the information on the predetermined traceability item about the unregistered product in the product information.

The information processing method may further include registering, in the product information, inventory data serving as a substitute for the information on the predetermined traceability item about the unregistered product when the information on the predetermined traceability item about the unregistered product is not registered in the product information after the second supplier has requested the first supplier to register the information on the predetermined traceability item about the unregistered product in the product information in response to notification sent to the second supplier.

In the information processing method, the information on the predetermined traceability item may include first information and second information. The first information may be information obtained from a result of measurement performed by each supplier in-house about the predetermined traceability item. The second information may be information on an amount of use in an in-house product of each supplier about a product supplied from another supplier positioned immediately upstream of each supplier.

In the information processing method, the notifying the second supplier may include notifying, when the unregistered product is an incorporated product for which the second information is not registered in the product information, the second supplier about an instruction to request the first supplier to register the second information in the product information.

In the information processing method, the notifying the second supplier may include notifying, when the unregistered product is an incorporated product for which the second information is registered and the first information is not registered in the product information, the second supplier about an instruction to request the first supplier to register, in the product information, the first information or inventory data serving as a substitute for the first information.

The information processing method may further include registering, in the product information, the inventory data serving as the substitute for the first information when the first information or the inventory data serving as the substitute for the first information is not registered in the product information after the second supplier has requested the first supplier to register the first information or the inventory data serving as the substitute for the first information in the product information in response to notification sent to the second supplier.

The information processing method may further include acquiring information on a product tree indicating relationships among the incorporated products incorporated in the target product. In the information processing method, the second supplier may be identified by referring to the information on the product tree.

In the information processing method, the storage device may include a first storage unit configured to store the product information on each of the incorporated products, and a second storage unit configured to store, for each of the incorporated products, inventory data serving as a substitute for the information on the predetermined traceability item of each of the incorporated products. The information processing method may include acquiring, when registering, in the product information stored in the first storage unit, the inventory data serving as the substitute for the information on the predetermined traceability item of the unregistered product, the inventory data associated with the unregistered product from the second storage unit.

In the information processing method, the predetermined traceability item May include a carbon footprint of products, a recycling rate related to a predetermined raw material, or a score related to due diligence.

An information processing system according to a third aspect of the present disclosure includes an information processing device including a storage device configured to store pieces of product information on a plurality of incorporated products incorporated in a target product. The product information is registered by a supplier of each of the incorporated products. The information processing system includes a plurality of terminals associated with the suppliers of the incorporated products. The information processing device is configured to: when an unregistered product that is an incorporated product for which information on a predetermined traceability item is not registered in the product information stored in the storage device is present, identify a second supplier positioned immediately downstream of a first supplier of the unregistered product in a supply chain defined by a plurality of the suppliers; and notify a terminal associated with the second supplier among the terminals to request the first supplier to register the information on the predetermined traceability item about the unregistered product in the product information.

In the information processing system, the information processing device may be configured to register, in the product information, inventory data serving as a substitute for the information on the predetermined traceability item about the unregistered product when the information on the predetermined traceability item about the unregistered product is not registered in the product information after the second supplier has requested the first supplier to register the information on the predetermined traceability item about the unregistered product in the product information in response to notification sent to the terminal associated with the second supplier.

According to the present disclosure, it is possible to facilitate the collection of pieces of information on the predetermined traceability item about the products such as components and materials incorporated in the target product.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 illustrates an example of relationships among products supplied by the supply chain;

FIG. 3 shows an outline of a process to be performed between company terminals and a server device;

FIG. 8 shows an example of product information generated by a product information generating unit;

FIG. 12 shows a registration request process according to the first embodiment;

FIG. 13 shows an inventory data registration process according to the first embodiment;

DETAILED DESCRIPTION OF EMBODIMENTS

Figure 1:
FIG. 1 illustrates an example of a supply chain according to a first embodiment.

In recent years, there may be a requirement to secure traceability of a carbon footprint of products (CFP), a recycling rate of a specific material, due diligence, etc. for a specific product such as a battery. For example, legislation that requires securing traceability of CFPs in batteries is about to be enacted in Europe.

It is assumed that conditions to be satisfied, such as a specified value and a target value, are set for an item for which the traceability as described above is required to be secured (hereinafter sometimes referred to as "traceability item"). Therefore, it is required to determine a value of a predetermined traceability item about the target product. In order to meet such a requirement, it is necessary to collect information on the predetermined traceability item about a plurality of products such as components and materials incorporated in a target product. The present disclosure provides a technology for solving such problems.

An information processing device according to a first aspect of the present disclosure includes a storage device and a control unit. The storage device stores pieces of product information on a plurality of products such as components and materials incorporated in a target product (hereinafter sometimes referred to as "incorporated products"). The product information stored in the storage device is information registered by a supplier of each of the incorporated products. That is, the supplier of each of the incorporated products registers the product information on its incorporated product by accessing the storage device of the information processing device.

The product information generally includes information on a predetermined traceability item for each incorporated product. Therefore, pieces of information on the predetermined traceability item about the incorporated products incorporated in the target product can be collected when the pieces of product information on the incorporated products are registered in the storage device of the information processing device by the suppliers. However, the registration of the information on the predetermined traceability item in the storage device may be burdensome for the supplier of the incorporated product. Therefore, there is a possibility that the information on the predetermined traceability item is not registered in the product information stored in the storage device. When the information on the predetermined traceability item about a part of the incorporated products is not registered in the product information stored in the storage device, values of the predetermined traceability item about all the incorporated products incorporated in the target product cannot be integrated. Therefore, it is difficult to determine the value of the predetermined traceability item about the target product.

An incorporated product for which the information on the predetermined traceability item is not registered in the product information stored in the storage device will be referred to as "unregistered product". A supplier of the unregistered product will be referred to as "first supplier". In the information processing device, when the unregistered product is present, the control unit identifies a second supplier positioned immediately downstream of the first supplier in a supply chain defined by a plurality of suppliers. The control unit notifies the second supplier to request the first supplier to register the information on the predetermined traceability item about the unregistered product in the product information stored in the storage device.

In the supply chain, the second supplier is a destination of delivery of the in-house product for the first supplier. Therefore, when the second supplier requests the first supplier to register the information on the predetermined traceability item about the unregistered product, the first supplier can effectively be prompted to register the information on the predetermined traceability item. According to the present disclosure, it is possible to facilitate the collection of the pieces of information on the predetermined traceability item about the incorporated products incorporated in the target product.

Specific embodiments of the present disclosure will be described below with reference to the drawings. The dimensions, materials, shapes, relative arrangements, etc. of components described in the embodiments are not intended to limit the technical scope of the present disclosure to those dimensions, materials, shapes, relative arrangements, etc. unless otherwise specified.

First Embodiment

A system according to the present embodiment provides information on products supplied by a supply chain including a plurality of companies. The information on products is typically information on traceability.

First, the structure of the supply chain will be described. In one example, at least some companies (intermediate suppliers) in the supply chain may receive components from one or more upstream companies, produce in-house products by using the received components, and deliver the produced in-house products to companies in the next step (downstream companies). Most upstream companies may directly produce in-house products and deliver the produced in-house products to companies in the next step. Some companies in the supply chain may directly deliver, to different companies, products received from other companies (i.e., participate in distribution). A plurality of companies repeats this process, and a final product is obtained in the final step.

FIG. 1 illustrates an example of the supply chain according to the present embodiment. In the example of FIG. 1, it is assumed that a product related to an automobile is obtained. Specifically, the supply chain shown in FIG. 1 includes an original equipment manufacturing (OEM) company and a plurality of supplier companies. The OEM company is a company that assembles a final product, and the supplier companies (companies A to C) are companies that supplies components, materials, assemblies, etc. for manufacturing the final product. The supplier companies each produce a plurality of products and deliver the products to a company positioned one level lower. The companies repeat this process, and a final product is assembled in the final step.

In certain hierarchical levels in the present embodiment, the side that delivers a product will be referred to as "upstream side", and the side that purchases the product and produces a new product will be referred to as "downstream side". A company positioned on the upstream side will herein be referred to as "upstream company", and a company positioned on the downstream side will herein be referred to as "downstream company". A product produced by the upstream company will be referred to as "upstream product", and a product produced by the downstream company will be referred to as "downstream product". The downstream product incorporates the upstream product as a component or material.

In the present embodiment, the hierarchical levels in the supply chain will be referred to as "tiers". Tier 0 is the lowest level at which the final product is assembled (i.e., Tier 0 corresponds to the OEM company). Transition is made to the upstream level in the order of Tiers 1, 2, and 3. Depending on the level of interest, the same company can be regarded as a downstream company or as an upstream company. For example, the company B positioned in Tier 2 is a downstream company in relation to Tier 3, but is an upstream company in relation to Tier 1. Thus, the definitions of the upstream company and the downstream company may vary from level to level.

FIG. 2 illustrates an example of relationships among products supplied by the supply chain. Supply relationships among a plurality of products constituting a final product X are represented by a tree diagram. In this example, the final product X is produced by assembling products A1, B1, C1, D1, etc. The product A1 is produced by assembling products A11, A12, A13, etc. In this way, the relationships among the products constituting the final product can be represented by a tree diagram in which the individual products serve as nodes. A tree diagram for a specific final product will hereinafter be referred to as "product tree". In one example, the final product X is a battery to be mounted on a battery electric vehicle (BEV). In another example, the final product X may be an automobile or an automobile-related product such as an automotive assembly.

A server device 1 according to the present embodiment collects pieces of information on products produced by the companies (hereinafter referred to as "product information") and information for linking the pieces of product information from terminals associated with the companies (company terminals 2), and generates the product tree based on these pieces of information. The product information generally includes information on a predetermined traceability item such as a carbon footprint of products (CFP) (hereinafter referred to as "traceability-related information"). By tracing the product tree in which the pieces of product information are linked, the predetermined traceability item can be traced. The traceability-related information may include any information that can be a target for securing traceability.

As shown in FIG. 1, an information processing system according to an example of the present embodiment includes the server device 1 and a plurality of company terminals 2. The company terminals 2 are associated with the companies constituting the supply chain. The server device 1 collects pieces of information for generating a product tree from the company terminals 2, and generates the product tree based on these pieces of information. The server device 1 can execute a traceability-related process (typically a process for calculating the CFP) based on the generated product tree. The result of execution of the process can be transmitted to the company terminals 2.

Next, an outline of a process for generating the product tree by the server device 1 will be described with reference to FIG. 3. FIG. 3 shows an outline of a process to be performed between the company terminals 2 and the server device 1. In the example of FIG. 3, it is assumed that a downstream company A and an upstream company B are present at any hierarchical levels. It is assumed that the company B produces a product B and delivers it to the company A, and the company A produces a product A by using the product B. That is, in the example of FIG. 3, the product B is a child node of the product A on the product tree.

To generate the product tree, the company terminal 2 associated with each company transmits information on a product produced by the company to the server device 1. In this example, the company terminal 2 associated with the company A transmits product information on the product A (referred to as "product information A") to the server device 1. Similarly, the company terminal 2 associated with the company B transmits product information on the product B (referred to as "product information B") to the server device 1. The product information of each company is stored in the server device 1.

An operation for linking the pieces of product information stored in the server device 1 is performed by the company terminal 2. In one example, a representative person of a downstream company logs into the server device 1 from the company terminal 2 by using an account of the downstream company, and selects an upstream product to be linked with a downstream product that is the in-house product. In this way, the pieces of product information are linked from the downstream product to the upstream product. The server device 1 links the pieces of product information with each other based on the selection.

If all the products in the supply chain and all the pieces of information on the products are presented as options for the selection of the product to be linked, however, the confidentiality will be lost for information on the companies constituting the supply chain and information on the products produced by the companies. Further, it may be inappropriate to disclose the entire product tree to one supplier.

Therefore, the server device 1 according to the present embodiment invests authority to access the product information on the upstream product in the downstream company in advance in response to a request from the upstream company. The server device 1 permits reference from the downstream company within a range of the invested authority.

In the example of FIG. 3, the company terminal 2 associated with the upstream company B transmits, to the server device 1, an instruction request (information) to "invest the company A with authority to access the product information B". When a linking request is received from the company terminal 2 associated with the company A, the server device 1 provides only a list of product information that the company A is authorized to access, and prompts the company A to make selection for product information to be linked. When the company terminal 2 associated with the company A requests reference to the product tree, the server device 1 provides the company terminal 2 with the product tree in which information other than the information that the company A is authorized to access is concealed. Thus, the information on irrelevant companies and products can be concealed.

For the final product manufactured by the OEM company, a predetermined condition to be satisfied is set about a predetermined traceability item. For example, it may legally be required that the value of the predetermined traceability item of the final product satisfy a predetermined specified value. In such a case, it is necessary to calculate the value of the predetermined traceability item of the final product. Therefore, the server device 1 identifies a plurality of products (incorporated products) such as components and materials incorporated in the final product based on the product tree. The server device 1 calculates the value of the predetermined traceability item of the final product by referring to pieces of traceability-related information in pieces of product information of the incorporated products.

Hardware Configurations

Figure 4:
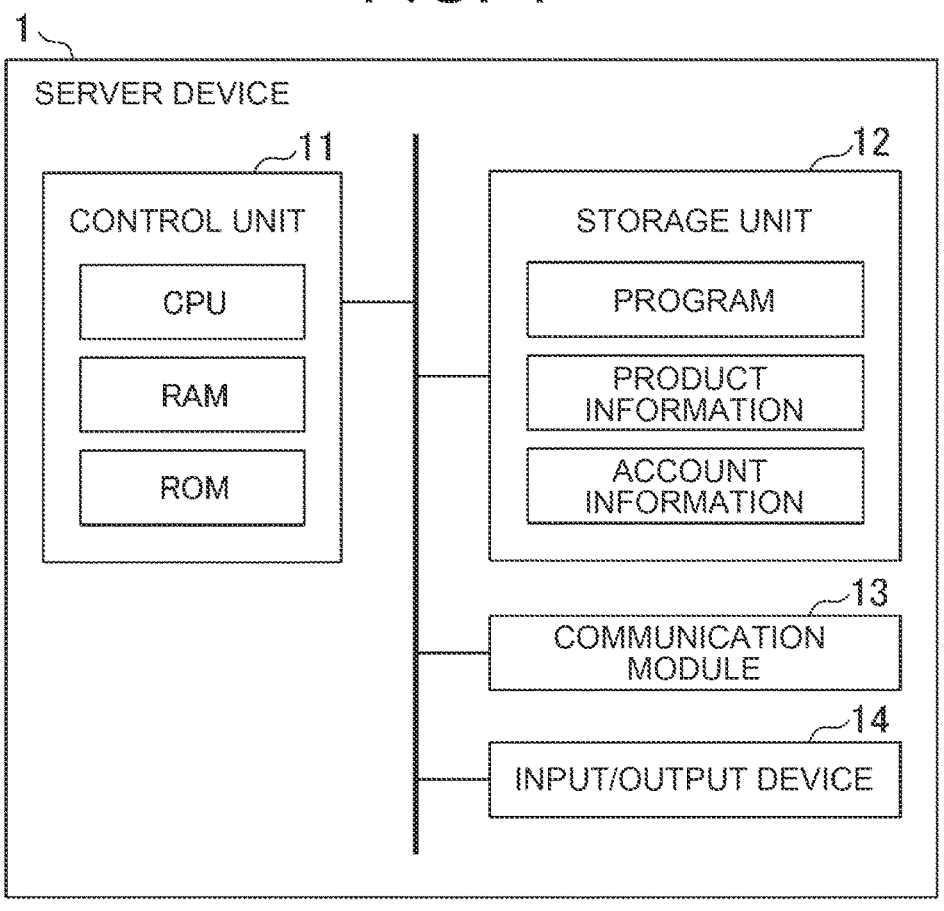
FIG. 4 is a hardware configuration diagram of the server device according to the first embodiment.

Next, the hardware configuration of the device constituting the system will be described with reference to FIG. 4. FIG. 4 schematically shows an example of the hardware configuration of the server device 1 according to the present embodiment. The server device 1 is a computer including a control unit 11, a storage unit 12, a communication module 13, and an input/output device 14.

The server device 1 may be a computer including a processor (e.g., a central processing unit (CPU) or a graphics processing unit (GPU)), a main storage device (e.g., a random access memory (RAM) or a read only memory (ROM)), and an auxiliary storage device (e.g., an erasable programmable read only memory (EPROM), a hard disk drive, or a removable medium). An operating system (OS), various programs, various tables, etc. are stored in the auxiliary storage device. The programs stored in the auxiliary storage device are executed such that various functions (software modules) can be implemented to meet a predetermined purpose as described later. Some or all of the modules may be implemented as hardware modules by a hardware circuit such as an application specific integrated circuit (ASIC) or a field programmable gate array (FPGA).

The control unit 11 is an arithmetic unit that implements various functions of the server device 1 by executing a predetermined program. The control unit 11 can be implemented by, for example, a hardware processor such as a CPU. The control unit 11 may include a RAM, a read only memory (ROM), a cache memory, etc.

The storage unit 12 is means for storing information, and is constituted by a storage medium such as a RAM, a magnetic disk, or a flash memory. The storage unit 12 stores programs to be executed by the control unit 11, data to be used by the programs, etc. A database is constructed in the storage unit 12 and stores pieces of product information collected from the company terminals 2 and pieces of account information related to the companies. Details will be described later.

The communication module 13 is a communication interface for connecting the server device 1 to a network. The communication module 13 may include, for example, a network interface board and a wireless communication interface for wireless communication. The server device 1 can perform data communication with other computers (e.g., another server device 1 or the company terminals 2) via the communication module 13.

The input/output device 14 is means for receiving an input operation performed by an operator and presenting information to the operator. Specifically, the input/output device 14 includes input devices such as a mouse and a keyboard, and output devices such as a display and a speaker. The input/output device may be, for example, a touch panel display in which the input devices and the output devices are integrated together.

In the specific hardware configuration of the server device 1, any component may be omitted, replaced, or added as appropriate depending on embodiments. For example, the control unit 11 may include a plurality of hardware processors. The hardware processor may be a microprocessor, an FPGA, a GPU, etc. The input/output device 14 may be omitted, or an input/output device other than the illustrated one (e.g., an optical drive) may be added. The server device 1 may be constituted by a plurality of computers. In this case, the hardware configurations of the computers may or may not agree with each other.

Figure 5:
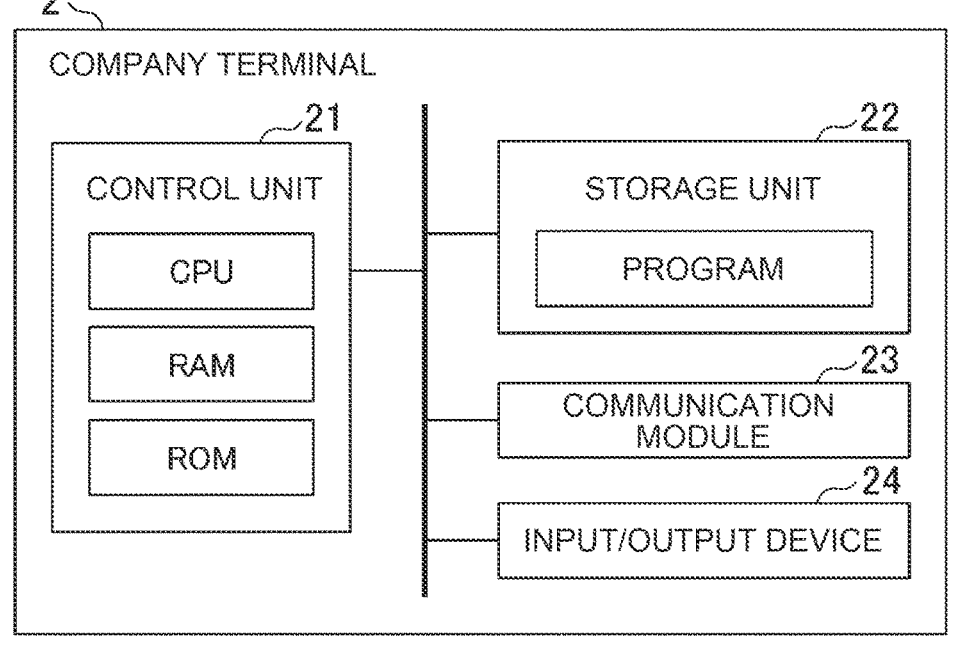
FIG. 5 is a hardware configuration diagram of the company terminal according to the first embodiment.

FIG. 5 schematically shows an example of the hardware configuration of the company terminal 2 according to the present embodiment. The company terminal 2 is a computer including a control unit 21, a storage unit 22, a communication module 23, and an input/output device 24.

Similarly to the server device 1, the company terminal 2 may be a computer including a processor (e.g., a CPU or a GPU), a main storage device (e.g., a RAM or a ROM), and an auxiliary storage device (e.g., an EPROM, a hard disk drive, or a removable medium). Some or all of the functions (software modules) may be implemented as hardware modules by a hardware circuit such as an ASIC or an FPGA.

The control unit 21 is an arithmetic unit that implements various functions (software modules) of the company terminal 2 by executing a predetermined program. The control unit 21 can be implemented by, for example, a hardware processor such as a CPU. The control unit 21 may include a RAM, a ROM, a cache memory, etc.

The storage unit 22 is means for storing information, and is constituted by a storage medium such as a RAM, a magnetic disk, or a flash memory. The storage unit 22 stores programs to be executed by the control unit 21, data to be used by the programs, etc.

The communication module 23 is a communication interface for connecting the company terminal 2 to a network. The communication module 23 may include, for example, a network interface board and a wireless communication interface for wireless communication. The company terminal 2 can perform data communication with other computers (e.g., the server device 1) via the communication module 23.

The input/output device 24 is means for receiving an input operation performed by an operator and presenting information to the operator. Specifically, the input/output device 24 includes input devices such as a mouse and a keyboard, and output devices such as a display and a speaker. The input/output device may be, for example, a touch panel display in which the input devices and the output devices are integrated together.

In the specific hardware configuration of the company terminal 2, any component may be omitted, replaced, or added as appropriate depending on embodiments similarly to the server device 1.

Software Configurations

Figure 6:
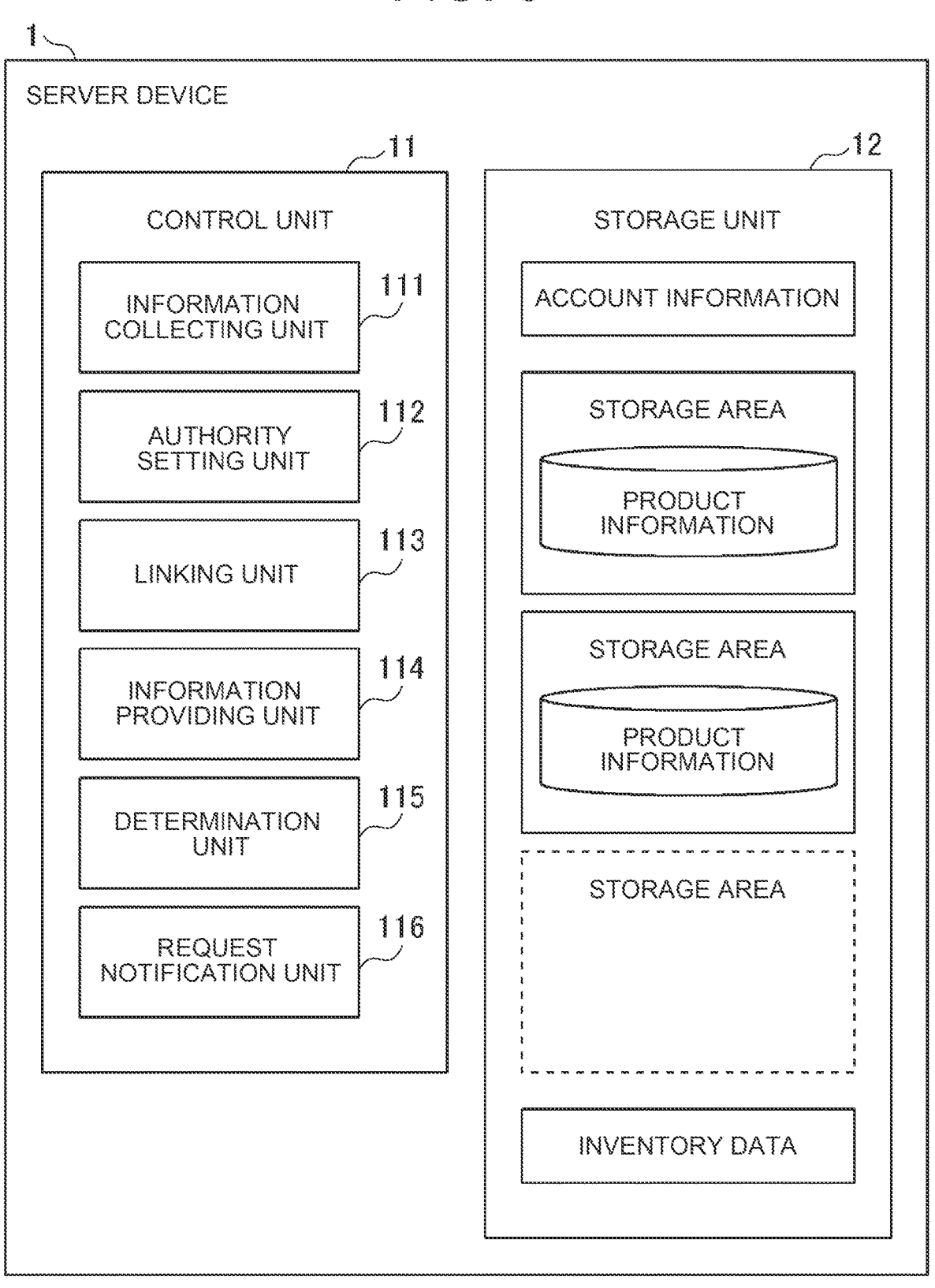
FIG. 6 is a software configuration diagram of the server device according to the first embodiment.

Next, the software configuration of the device constituting the system will be described with reference to FIG. 6. FIG. 6 schematically shows an example of the software configuration of the server device 1 according to the present embodiment. In the present embodiment, the control unit 11 includes six software modules that are an information collecting unit 111, an authority setting unit 112, a linking unit 113, an information providing unit 114, a determination unit 115, and a request notification unit 116. The software modules may be implemented by the control unit 11 (CPU)

executing programs stored in the storage unit 12. Information processing to be executed by the information collecting unit 111, the authority setting unit 112, the linking unit 113, the information providing unit 114, the determination unit 115, and the request notification unit 116 is synonymous with information processing to be executed by the control unit 11.

The information collecting unit 111 executes a process for receiving product information transmitted from the company terminal 2 and storing the product information in the storage unit 12. The authority setting unit 112 receives information for setting authority to access the product information (hereinafter referred to as "permission information") from the company terminal 2. The authority setting unit 112 executes a process for setting authority to access the product information stored in the storage unit 12 based on the received information.

The linking unit 113 acquires information for linking pieces of product information from the company terminal 2 by interacting with the company terminal 2. The linking unit 113 executes a process for writing information indicating a linking relationship for the pieces of product information stored in the storage unit 12 based on the acquired information. The linking unit 113 executes a process for receiving a request to assign termination information and, in response to the request, assigning the termination information to the product information stored in the storage unit 12. A product tree is formed by reflecting the linking and termination. That is, the product tree is formed by saving the linking information and the termination information in the storage unit 12. The linking unit 113 generates the product tree based on results of the linking and termination.

The information providing unit 114 executes information processing related to the product tree and outputs a result of executing the information processing. The information processing related to the product tree may include a process for performing calculation on a predetermined traceability item in the product tree. The output of the result of executing the information processing may include a process for providing information on the generated product tree to the company terminal 2. In one example, the information providing unit 114 generates information on the product tree and outputs the generated information on the product tree.

In the present embodiment, the storage unit 12 includes a plurality of logical storage areas. Different access authorities can be set in the storage areas, such as an area that the company A is authorized to access, an area that the company B is authorized to access, or an area that both the companies A and B are authorized to access. The authority setting unit 112 sets the access authority by storing the product information received from the company terminal 2 in an appropriate storage area. A specific processing method will be described later.

The storage unit 12 stores account information. In the present embodiment, an operator of each company logs into the server device 1 via the company terminal 2 by using an account of the corresponding company to perform interaction between the server device 1 and the company terminal 2. The account information is information on an account associated with each company constituting the supply chain. The login using an account is an example of access to the server device 1 as a corresponding company. The method for accessing the server device 1 is not limited to such an example, and may be selected as appropriate depending on embodiments.

A database for storing inventory data is constructed in the storage unit 12. In this inventory data database, inventory data for each traceability item is stored for each type or tier of the incorporated product. The inventory data is predetermined as a typical value of each traceability item. By accessing the storage unit 12 of the server device 1 via the company terminal 2, the operator of each company can acquire inventory data serving as a substitute for information on a desired traceability item from the database.

Information on a product tree for the final product X generated by the information providing unit 114 is stored in the storage unit 12. When executing a traceability-related process on the final product X, the information providing unit 114 identifies a plurality of incorporated products incorporated in the final product X by referring to the information on the product tree stored in the storage unit 12. The information providing unit 114 extracts pieces of traceability-related information from pieces of product information on the incorporated products stored in the storage areas of the storage unit 12. The information providing unit 114 calculates a value of the predetermined traceability item of the final product X by integrating the extracted pieces of traceability-related information on the incorporated products.

There is a possibility that the traceability-related information is not registered in the product information transmitted from the company terminal 2. In this case, the product information in which the traceability-related information is not registered is stored in the storage area of the storage unit 12. In the control unit 11, the determination unit 115 determines whether an unregistered product is present among the incorporated products incorporated in the final product X. The unregistered product is an incorporated product for which traceability-related information is not registered in product information stored in the storage area of the storage unit 12. A supplier of the unregistered product may hereinafter be referred to as "first supplier".

In the control unit 11, the request notification unit 116 transmits a request instruction to the company terminal 2 of a second supplier positioned immediately downstream of the first supplier in the supply chain when the unregistered product is present. The request instruction is instruction information for requesting the first supplier to register the traceability-related information on the unregistered product in the product information (product information stored in the storage area of the storage unit 12).

Figure 7:
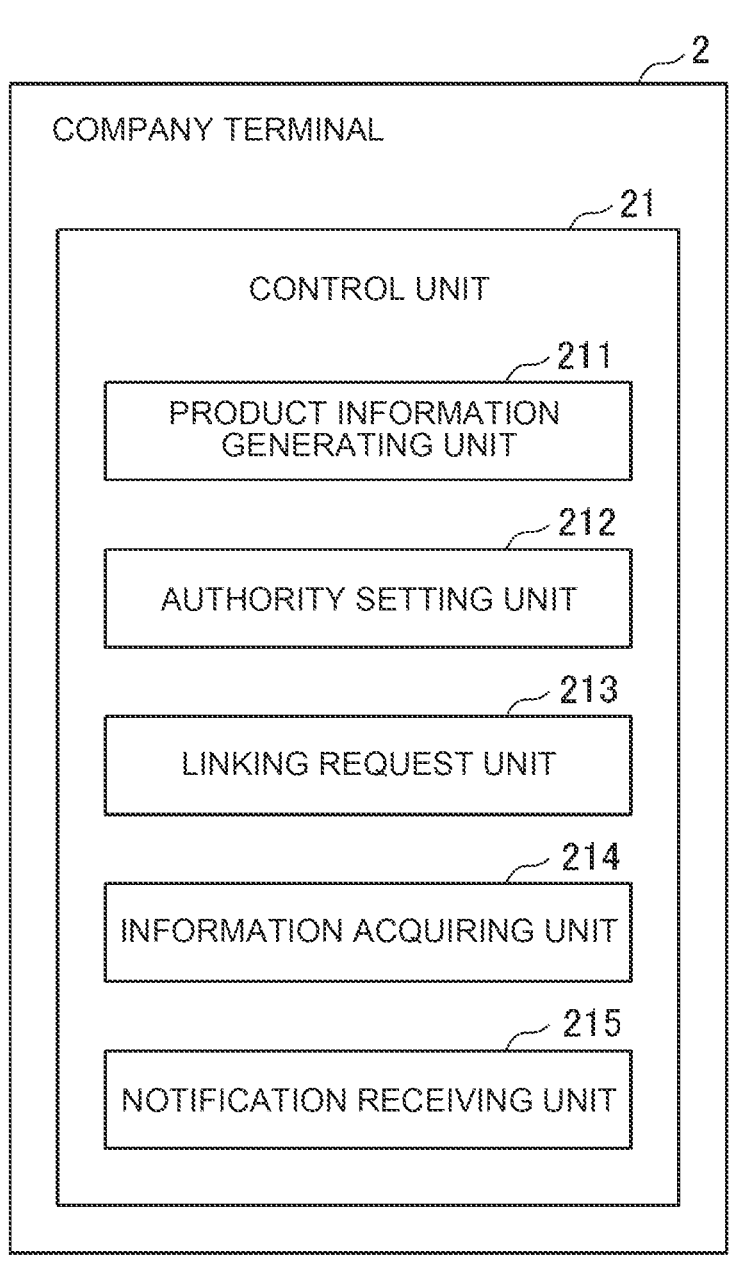
FIG. 7 is a software configuration diagram of the company terminal according to the first embodiment.

FIG. 7 schematically shows the software configuration of the company terminal 2 according to the present embodiment. In the present embodiment, the control unit 21 includes five software modules that are a product information generating unit 211, an authority setting unit 212, a linking request unit 213, an information acquiring unit 214, and a notification receiving unit 215. The software modules may be implemented by the control unit 21 (CPU) executing programs stored in the storage unit 22. Information processing to be executed by the product information generating unit 211, the authority setting unit 212, the linking request unit 213, the information acquiring unit 214, and the notification receiving unit 215 is synonymous with information processing to be executed by the control unit 21.

The product information generating unit 211 generates information (product information) on a product (incorporated product) of a company associated with the company terminal 2. FIG. 8 shows an example of the product information generated by the product information generating unit 211. The product information may be input via a device operator. In the present embodiment, the product information includes fields for a company identifier (ID), a company name, a product ID, and a product name. The company ID and the company name are an identifier and a name of a company that produces a target incorporated product (i.e., the company that uses the company terminal 2). The product ID and the product name are an identifier and a name of the target incorporated product.

The product information further includes linking-related information. The linking-related information is information for identifying an upstream product linked to the target incorporated product. In the present embodiment, the linking-related information includes fields for "upstream product information" and "termination flag".

The upstream product information field stores information for identifying product information associated with the upstream product linked to the target incorporated product (i.e., a product necessary for producing the target incorporated product). The upstream product information field is used when the server device 1 links products. When the product information is generated, the target incorporated product is not basically linked to the upstream product. Therefore, the upstream product information field need not store a value indicating the upstream product.

The termination flag field stores a flag indicating whether the target incorporated product is a leaf node in the product tree, that is, a node positioned on the most upstream (terminal end) side. In the present embodiment, the plurality of company terminals 2 transmits pieces of product information. Therefore, this flag is used to determine whether an upstream product is linked to a certain product in the product tree or no more products are linked to the certain product (whether the target incorporated product is positioned on the most upstream side). That is, the termination flag field is used when the server device 1 finalizes the linking between products. When the product information is generated, the linking relationship of the target incorporated product is basically not finalized. Therefore, the termination flag field may store "0" indicating that the target incorporated product is not currently on the most upstream side. To finally generate the product tree, the status of the product information of each company stored in the server device 1 is set to "linked to upstream product" or "termination flag is set to "1" indicating that target incorporated product is on most upstream side".

The product information further includes fields for traceability-related information to be registered. In one example, the traceability-related information may include amounts of materials (e.g., upstream products) used per production volume of the product, information on a recycling rate of a predetermined raw material, a value obtained by converting an amount of greenhouse gases emitted when producing the product in-house into an amount of carbon dioxide emission ($CO_2$ emission amount during production: hereinafter referred to as "in-house CFP"), due diligence-related information (DD information), or a combination thereof. Examples of the predetermined raw material include lithium, nickel, cobalt, lead, and graphite. The recycling rate may be expressed directly or may be expressed indirectly, for example, by a combination of the total use amount and the amount of use of the recycled material. These values are associated with the process of producing the target incorporated product. In the example of FIG. 3, the traceability-related information in the product information A stores a value obtained by converting an amount of greenhouse gases emitted in-house in the production activities of the product A into an amount of carbon dioxide emission (i.e., an in-house CFP for the product A). The traceability-related information in the product information A does not include information on the processes up to the production of the upstream product (e.g., an amount of greenhouse gases emitted until the upstream product B is produced).

The traceability-related information may be selected as appropriate depending on embodiments. In one example, the CFP may include emissions in scope 1, scope 2, and scope 3. Scope 1 may cover an amount of direct greenhouse gas emissions. Scope 2 may cover an amount of indirect emissions along with the use of electricity, heat, and steam supplied by other companies. Scope 3 may cover an amount of indirect emissions other than those in scope 1 and scope 2. In one example, the due diligence-related information may be technical documentation on a product containing a target raw material (e.g., cobalt, natural graphite, lithium, or nickel), indicating that responsible mineral sourcing obligations are met for the amount of the raw material contained in the product, a smelter, etc. In another example, the due diligence-related information may include a score indicating the degree to which the obligations are met.

The product information generating unit 211 acquires such information via the operator of the company terminal 2 and transmits it to the server device 1 at any timing.

The authority setting unit 212 designates a downstream company that is permitted to access the product information transmitted from the company terminal 2 to the server device 1. The authority setting unit 212 receives designation of a downstream company that is permitted to access any in-house product.

The linking request unit 213 requests the server device 1 to link the in-house product information transmitted to the server device 1 to an upstream product. In one example, the linking request unit 213 first transmits a company ID and a product ID of the company of interest to the server device 1, and requests linking of product information associated with the product ID. The server device 1 generates a user interface including a list of product information (i.e., linking destination candidates) that the target company is permitted to access, and provides the generated user interface to the company terminal 2.

Subsequently, the linking request unit 213 prompts the operator to select an upstream product to be linked from the list. The linking request unit 213 transmits, to the server device 1, a pair of an identifier of a linking source product (downstream product) and an identifier of the linking destination upstream product. In response to this, the server device 1 can link the pieces of product information. When there is no upstream product to be linked to the target incorporated product, pieces of product information are not linked.

The information acquiring unit 214 requests the server device 1 to provide the product tree and outputs the information transmitted from the server device 1.

When the company terminal 2 is a terminal of the second supplier, the notification receiving unit 215 receives a request instruction transmitted from the server device 1, and outputs the received request instruction. By outputting the request instruction at the company terminal 2 of the second supplier, the second supplier is notified to request the first supplier to register the traceability-related information on the unregistered product.

Details of Process Related to Product Tree Formation

Figure 9:
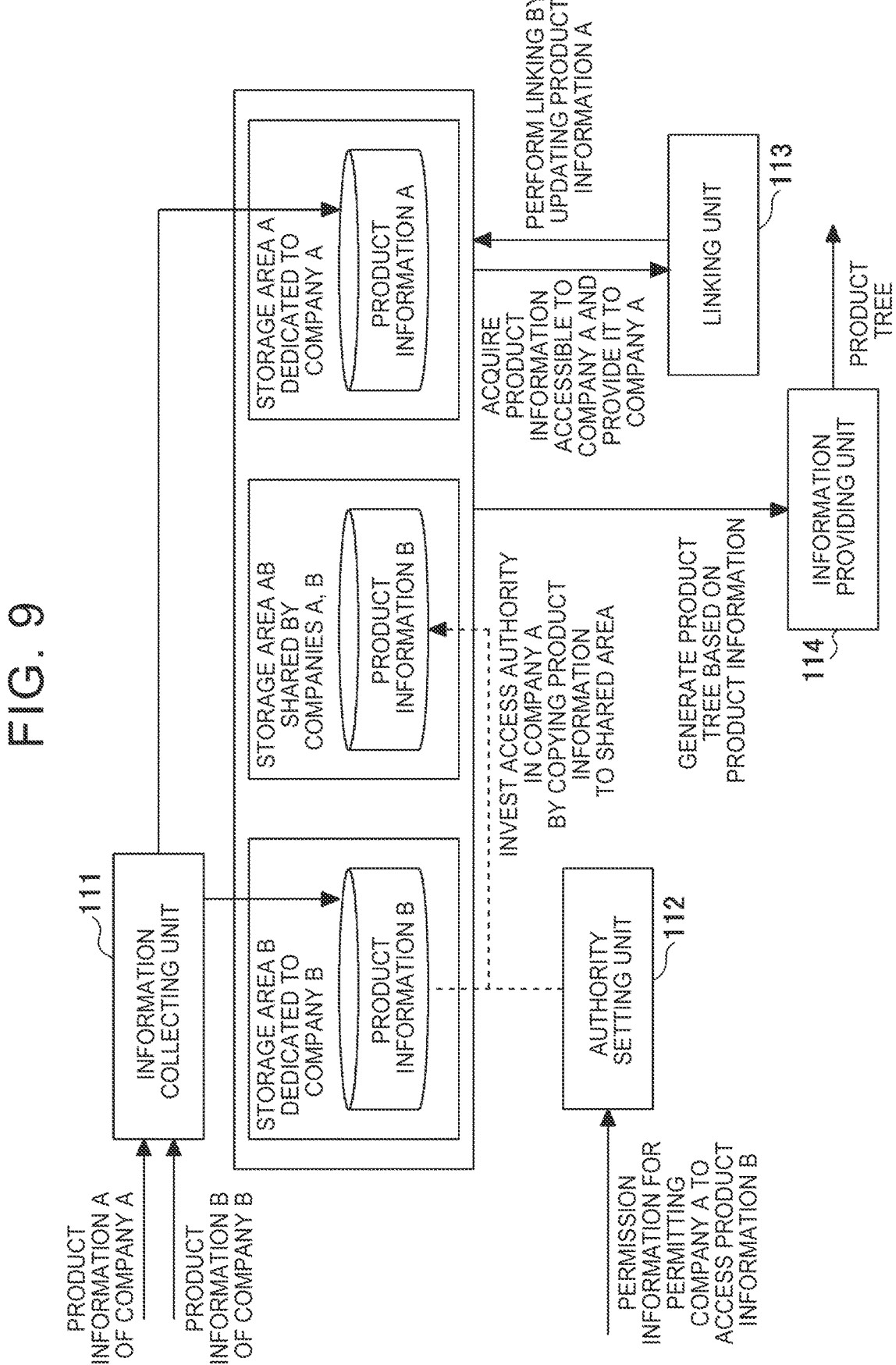
FIG. 9 shows an example of a flow of a process to be executed by the server device.

Next, details of a process to be performed by the server device 1 and the company terminal 2 will be described. FIG. 9 shows an example of a flow of a process to be executed by the server device 1 based on a request from the company terminal 2. The process to be performed by the server device 1 can roughly be divided into the following four phases.

(1) First phase for receiving product information transmitted from the company terminal 2 and storing the received product information (2) Second phase for receiving permission information transmitted from the company terminal 2 and setting authority to access the product information based on the received permission information (3) Third phase for linking pieces of product information by interacting with the company terminal 2

(4) Fourth phase for providing information on a product tree based on a linking result In the example of FIG. 9, a company A is a downstream company and a company B is an upstream company. A product produced by the company A will be referred to as "product A", and a product produced by the company B will be referred to as "product B". Product information associated with the product A will be referred to as "product information A", and product information associated with the product B will be referred to as "product information B".

In the first phase, the information collecting unit 111 of the server device 1 acquires product information from the product information generating unit 211 of the company terminal 2. In the example of FIG. 9, the server device 1 acquires the product information A from the company terminal 2 associated with the company A, and acquires the product information B from the company terminal 2 associated with the company B. The information collecting unit 111 saves the product information A in a storage area that only the company A is authorized to access (hereinafter referred to as "storage area A"). The information collecting unit 111 saves the product information B in a storage area that only the company B is authorized to access (hereinafter referred to as "storage area B"). In this way, the information collecting unit 111 saves the product information transmitted from any company in a dedicated storage area that only the company is authorized to access.

In the second phase, the authority setting unit 112 of the server device 1 receives permission information from the authority setting unit 212 of the company terminal 2, and sets authority to access the product information based on the received permission information. The permission information is information in which a product is associated with a company permitted to access product information on the product.

In the example of FIG. 9, it is assumed that the authority setting unit 112 receives permission information indicating that the downstream company A is permitted to access the product information B of the upstream company. In this case, the authority setting unit 112 copies the product information B stored in the storage area B to a storage area that both the companies A and B are authorized to access (hereinafter referred to as "storage area AB"). Thus, the product information B is accessible to both the companies A and B. When no access authority is set for a specific item in the product information, the item is excluded from the target of copy to the storage area AB.

In the following description, a storage area that only a specific company is authorized to access will be referred to as "dedicated storage area", and a storage area that a plurality of companies is authorized to access will be referred to as "shared storage area".

The server device 1 copies the product information in response to reception of the permission information from the company terminal 2. That is, the company terminal 2 transmits the permission information to the server device 1 to cause the server device 1 to copy the product information identified by the permission information from the dedicated storage area of the target company to the shared storage area accessible to the downstream company.

In the third phase, the linking unit 113 of the server device 1 receives a linking request from the linking request unit 213 of the company terminal 2, and links the pieces of product information based on the received linking request.

First, the linking unit 113 receives the linking request from the company terminal 2. The linking request is transmitted from the company terminal 2 of the downstream company. In the example of FIG. 9, it is assumed that the company terminal 2 of the company A transmits the linking request. The linking request includes a company ID and a product ID of a target incorporated product. The linking unit 113 acquires product information stored in the storage area accessible to the company, and generates a list of the acquired product information. In the example of FIG. 9, the company A can access the product information B stored in the storage area AB. Therefore, the product information B can be selected as a linking destination in the company terminal 2 of the company A.

The linking request unit 213 of the company terminal 2 presents the list to an operator, and prompts the operator to select products to be linked. In this example, the product A and the product B are linking targets. For example, the operator inputs, via the input/output device 24, information indicating that the product B is an upstream product for the product A. The linking request unit 213 transmits data for associating the upstream product (product B) and the downstream product (product A) with each other (linking data) to the linking unit 113.

As described with reference to FIG. 8, the product information includes the field related to the product to be linked (linking-related information). Based on the linking data, the linking unit 113 stores information associated with the product information B (i.e., the upstream product) in the linking-related information of the product information A. For example, the linking-related information stores an identifier of the upstream product and an identifier of the company that produces the upstream product.

The linking-related information may store, for example, a pointer to the linking destination product information. The pointer indicates, for example, an address of the product information associated with the upstream product. Through the process described above, a part of the tree structure is formed with the product information on the downstream product as a parent node and the product information on the upstream product as a child node.

No further linking is performed at the terminal end of the product tree. In this case, the linking request unit 213 transmits data indicating that the product is the terminal end of the tree instead of transmitting the linking data. When the data is received, the linking unit 113 sets "1" in the termination flag field of the corresponding product information. That is, the "process for setting linking destination upstream product" or the "process for setting termination flag" is executed in the third phase.

In the fourth phase, the information providing unit 114 of the server device 1 generates information on the product tree based on the stored pieces of product information, and outputs the information on the product tree. The generation of the information on the product tree can include, for example, a process for generating various types of information on the products (e.g., information on traceability and an image showing the linking relationship among the products in a tree diagram) after links between nodes are formed by linking the pieces of product information. To generate the information on the product tree, it is necessary that all the pieces of product information have been linked and the termination flags of all the leaf nodes have been set to "1". The information providing unit 114 can appropriately generate the information when such conditions are satisfied.

As described with reference to FIG. 2, the product tree in the present embodiment is a tree diagram showing the supply relationships among the pieces of product information in the supply chain. The information providing unit 114 can generate the image showing the tree diagram based on the pieces of product information.

Traceability-Related Process

The information providing unit 114 executes a process for referring to pieces of traceability-related information in pieces of product information on a plurality of incorporated products that are linked in the product tree, and integrating these pieces of information.

Figure 10:
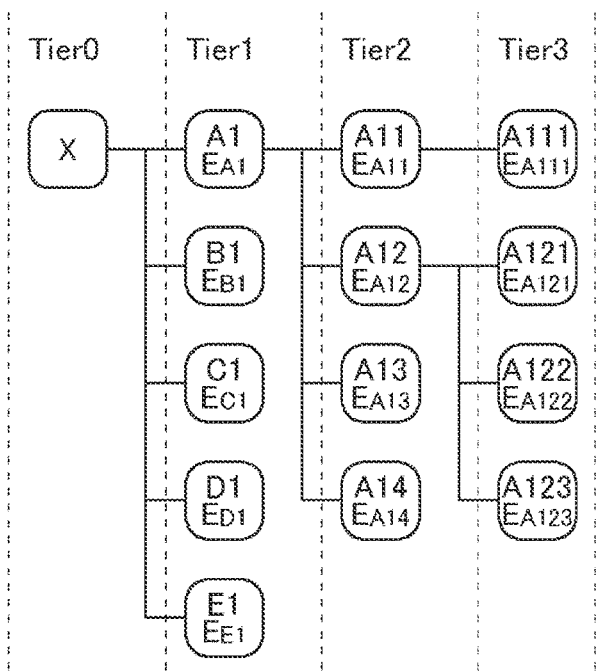
FIG. 10 illustrates a product tree of a plurality of products constituting a final product and in-house carbon footprints of products (CFPs) for the individual products.

The integration of the pieces of traceability-related information will be described with reference to FIG. 10. FIG. 10 illustrates the products (incorporated products) constituting the final product X and in-house CFPs for the individual products. For example, it is assumed that $E_{A12}$ [g] of carbon dioxide is emitted in a process for producing the product A12 in the figure. It is also assumed that this product is composed of three upstream products A121 to A123. A value obtained by converting the total amount of greenhouse gases emitted until a certain product is produced into an amount of carbon dioxide (hereinafter referred to as "integrated CFP") can be obtained by repeating a process of transferring the amount of $CO_2$ emission associated with an upstream product to a downstream product between companies at two adjacent hierarchical levels from the most upstream product at the leaf node to the product of interest.

When a product subjected to integration of pieces of traceability-related information is A12 in the example of FIG. 10, the integrated CFP of the product A12 can be calculated by summing the amounts of $CO_2$ emission associated with the upstream products A121 to A123 for the product A12 and the amount of $CO_2$ emission associated with the product A12. That is, the integrated CFP of the product A12 is as follows.

$$I_{A12}=E_{A12}+E_{A121}\times U_{A121}+E_{A122}\times U_{A122}+E_{A123}\times U_{A123}$$
$$[g]$$

In this expression, $I_{A12}$ is the integrated CFP of the product A12. Further, $E_{A12}$ is the in-house CFP of the product A12. Further, $E_{A121}$, $E_{A122}$, and $E_{A123}$ are $CO_2$ emissions per unit amount (i.e., in-house CFPs per unit amount) when the products A121, A122, and A123 are produced, respectively. Further, $U_{A121}$, $U_{A122}$, and $U_{A123}$ are the amounts of use of the products A121, A122, and A123 in the production of the product A12, respectively. This use amount is an example of the amount of material used per production volume of the product in the traceability-related information.

The integrated value may be stored in the storage unit 12 in association with the product or may be included as a part of the product information. That is, the product information associated with the product A12 may hold both $E_{A12}$ that is the emission amount in the process alone (in-house CFP) and $I_{A12}$ that is the integrated emission amount (integrated CFP).

When a product subjected to integration of pieces of traceability-related information is the product A1, the integrated CFP of the product A1 can be calculated by integrating the amount of $CO_2$ emission associated with the product A1 and the amounts of $CO_2$ emission associated with the upstream products A11 to A14 for the product A1. The upstream product A11 incorporates a further upstream product A111, and the upstream product A12 incorporates the further upstream products A121 to A123. Therefore, when calculating the integrated CFP of the product A1, $CO_2$ during production of the product A111 and the products A121 to A123 is also taken into consideration. That is, the integrated CFP of the upstream product A11 is used as the amount of $CO_2$ emission associated with the product A11. The integrated CFP of the upstream product A12 is used as the amount of $CO_2$ emission associated with the product A12. The total amount of $CO_2$ emission of the final product (product of the most downstream company) (i.e., the integrated CFP of the final product) can be obtained by sequentially executing the above calculation from the product of the most upstream company to the final product.

As described above, post-integration traceability-related information (e.g., the integrated CFP of an upstream product) is reused when performing integration for a downstream product. By executing this process at each hierarchical level starting from the most upstream side, the traceability-related information is sequentially transferred in the downstream direction. When the traceability-related information is finally transferred to the final product, the traceability-related information associated with the entire period until the final product is produced can be obtained.

In this way, when generating the information on the product tree, the information providing unit 114 may repeat the process of sequentially integrating the pieces of traceability-related information defined in the pieces of product information from the most upstream side to the most downstream side. In the above example, the amount of carbon dioxide emission is exemplified as the integration target, but the traceability-related information that is the integration target may be a recycling rate related to a predetermined raw material, a score related to due diligence, etc. When the traceability-related information is a numerical value, the integration may be performed by numerical calculation. When the traceability-related information is non-numerical information (e.g., due diligence-related information), the integration may simply be information collection.

In another example, the product information may include information indicating the location of the traceability-related information of the corresponding product (hereinafter referred to as "location information"; typically address or pointer). In this case, the traceability-related information need not be included in the product information. The integration may be collection of the location information included in the product information.

The information providing unit 114 may output the generated product tree in an image format. The information providing unit 114 may simultaneously output the traceability-related information associated with any product.

Figure 11:
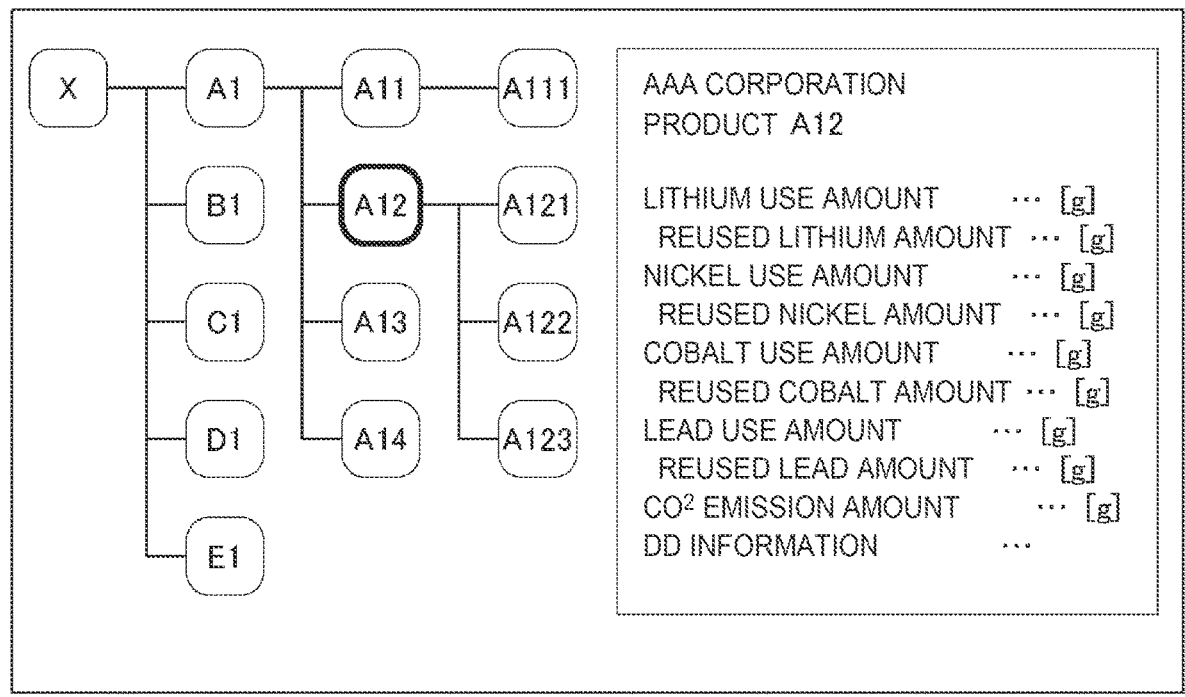
FIG. 11 shows an example of a screen in which the product tree is output as an image.

FIG. 11 shows an example of a screen in which the product tree is output as an image. The illustrated screen includes an image showing a tree diagram of the supply relationships among the products constituting the final product. When any product is selected, the traceability-related information associated with the product or the result of the integration of the pieces of traceability-related information associated with the entire period until the product is produced (e.g., integrated CFP: amount of carbon dioxide emission) can be viewed. FIG. 11 illustrates image display for a result of integration of pieces of traceability-related information when the product A12 is selected. Such information can be output via the input/output device 14 of the server device 1 based on an operation performed by the operator of the server device 1.

The information providing unit 114 may provide the generated product tree to the company terminal 2 in response to a request from the company terminal 2 (information acquiring unit 214). It may be inappropriate to disclose the entire product tree to a specific company. Therefore, when providing the product tree to the company terminal 2 associated with a certain company, the information providing unit 114 may perform a process for hiding a range that the company is not authorized to access. The information providing unit 114 stores information on the generated product tree in the storage unit 12.

Registration Request Process

As described above, in the present embodiment, the process of integrating the pieces of traceability-related information is executed based on the pieces of product information on the incorporated products stored in the storage unit 12. When the incorporated products incorporated in the final product X include a product for which traceability-related information is not registered in product information (unregistered product), the pieces of traceability-related information on all the incorporated products cannot be integrated. In this case, the value of the predetermined traceability item of the final product cannot be calculated.

Therefore, the server device 1 executes a process for requesting the first supplier of the unregistered product to register the traceability-related information on the unregistered product. At this time, the control unit 11 of the server device 1 identifies a plurality of incorporated products incorporated in the final product X by tracing the product tree stored in the storage unit 12 in association with the final product X. That is, in the server device 1, the process for requesting registration of the traceability-related information is executed in a state in which the information on the product tree for the final product X generated by the above generation method is stored in the storage unit 12. The control unit 11 notifies the second supplier positioned immediately downstream of the first supplier in the supply chain to request the first supplier to register the traceability information on the unregistered product in the storage unit 12.

Processing Flow

A flow of the process for requesting registration of the traceability-related information on the unregistered product (hereinafter sometimes referred to as "registration request process") to be executed by the server device 1 will be described below with reference to FIG. 12. FIG. 12 shows the registration request process according to the present embodiment. The process shown in FIG. 12 may automatically be executed by the server device 1. The process shown in FIG. 12 may be executed by an operator of the OEM company logging into the server device 1 by using the account of the OEM company and issuing an instruction to execute the process.

In the registration request process shown in FIG. 12, the control unit 11 first receives information indicating a target final product X in S101. In S102, the information providing unit 114 of the control unit 11 identifies a plurality of incorporated products incorporated in the final product X by tracing information on a product tree stored in the storage unit 12 in association with the final product X.

In S103, the determination unit 115 of the control unit 11 accesses pieces of product information stored in the storage unit 12 on the incorporated products identified in S102. The determination unit 115 determines whether an unregistered product is present among the incorporated products. When the determination result is "NO" in S103, the execution of the process shown in FIG. 12 is terminated. In this case, pieces of traceability-related information are registered in the pieces of product information stored in the storage unit 12 on all the incorporated products incorporated in the final product X. Therefore, the information providing unit 114 can execute a process for calculating a value of the predetermined traceability item of the final product X.

When the determination result is "YES" in S103, that is, when the unregistered product is present among the incorporated products, a process of S104 is executed. In S104, the request notification unit 116 of the control unit 11 identifies a second supplier positioned immediately downstream of a first supplier of the unregistered product in the supply chain by referring to the information on the product tree. In S105, the request notification unit 116 transmits a request instruction to the company terminal 2 of the second supplier identified in S104. In S105, the request notification unit 116 may output the request instruction to the account of the second supplier.

In the registration request process described above, the second supplier is notified to request the first supplier to register the traceability-related information on the unregistered product in the product information. When the second supplier requests the first supplier to register the traceability-related information in the product information as a result of the notification, the first supplier can be prompted to register the traceability-related information. The second supplier is a company positioned immediately downstream of the first supplier in the supply chain. That is, the second supplier is a destination of delivery of the in-house product for the first supplier. By issuing the registration request to the first supplier from the second supplier, the first supplier can effectively be prompted to register the traceability-related information. With the registration request process according to the present embodiment, it is possible to facilitate the collection of pieces of information on the predetermined traceability item about the incorporated products incorporated in the final product X.

A plurality of unregistered products may be present among the incorporated products incorporated in the final product X. In this case, in S104 of the registration request process shown in FIG. 12, the request notification unit 116 identifies a plurality of second suppliers positioned immediately downstream of the respective first suppliers. In S105 of the registration request process shown in FIG. 12, the request notification unit 116 transmits request instructions to the company terminals 2 of the second suppliers.

As shown in FIG. 8, the traceability-related information in the product information on the incorporated product includes the field for registration of information on the amount of an upstream product used in the in-house product. When the incorporated product is positioned on the most upstream side in the product tree, there is no upstream product. Therefore, the information on the amount of an upstream product used in the in-house product cannot be registered in the product information. Therefore, the incorporated product positioned on the most upstream side in the product tree is not handled as the unregistered product in the registration request process even though the information on the amount of an upstream product used in the in-house product is not registered as the traceability-related information.

Inventory Data Registration Process

As described above, in the present embodiment, the second supplier requests the first supplier to register the traceability-related information in the product information in response to reception of the request instruction from the server device 1. Even when the first supplier receives such a registration request from the second supplier, the first supplier does not always register the traceability-related information for every unregistered product. That is, the traceability-related information on the unregistered product may remain unregistered in the storage area of the storage unit 12 even after the registration request process is executed by the server device 1.

In such a case, the control unit 11 registers inventory data serving as a substitute for the traceability-related information on the unregistered product in the product information on the unregistered product stored in the storage unit 12. Thus, the information providing unit 114 can execute the process of integrating the pieces of traceability-related information by using the inventory data as data on the unregistered product.

Processing Flow

A flow of the process for registering the inventory data serving as a substitute for the traceability-related information on the unregistered product in the product information stored in the storage unit 12 (hereinafter sometimes referred to as "inventory data registration process") to be executed by the server device 1 will be described below with reference to FIG. 13. FIG. 13 shows the inventory data registration process according to the present embodiment.

When the second supplier requests the first supplier to register the traceability-related information in the product information, information indicating completion of execution of the registration request is transmitted from the company terminal 2 of the second supplier to the server device 1. The server device 1 executes the process shown in FIG. 13 after a predetermined period has elapsed since the information indicating completion of execution of the registration request was received from the company terminal 2 of the second supplier.

In the inventory data registration process shown in FIG. 13, the control unit 11 of the server device 1 first determines in S201 whether the traceability-related information on the unregistered product remains unregistered in the product information stored in the storage unit 12. When the determination result is "NO" in S201, that is, when the traceability-related information on the unregistered product has already been registered, the execution of the process shown in FIG. 13 is terminated.

When the determination result is "YES" in S201, a process of S202 is executed. In S202, the control unit 11 extracts inventory data from the database of the storage unit 12 as a substitute for the traceability-related information on the unregistered product. In S203, the control unit 11 registers the inventory data extracted in S202 in the field for registration of the traceability-related information in the product information on the unregistered product stored in the storage unit 12.

Second Embodiment

The configuration of a system according to the present embodiment is the same as that of the system according to the first embodiment. In the present embodiment as well, information on the product tree for the final product X is generated by executing the same processes as the processes according to the first embodiment in the server device 1 and each company terminal 2. The generated information on the product tree is stored in the storage unit 12 of the server device 1. When the incorporated products incorporated in the final product X include an unregistered product, the server device 1 executes the registration request process. However, the details of the registration request process are different from those in the first embodiment.

Inventory Data Database

An inventory data database according to the present embodiment will be described. In the present embodiment as well, a database for storing inventory data on each traceability item is constructed in the storage unit 12 of the server device 1. In this inventory data database, the inventory data is stored for each type or tier of the incorporated product. In the present embodiment, the inventory data is not stored in the database of the storage unit 12 for every traceability item in the product information.

As described above with reference to FIG. 8, the traceability-related information in the product information includes traceability items such as the amount of each upstream product used per production volume of the product, information on a recycling rate of a predetermined raw material, an in-house CFP, and due diligence-related information (DD information). Among these traceability items, the information on the recycling rate of the predetermined raw material, the in-house CFP, and the due diligence-related information are pieces of information obtained from results of measurements performed by each supplier in-house. The information obtained from the result of measurement performed by each supplier in-house will hereinafter be referred to as "first information". Among the traceability items in the traceability-related information, the information on the amount of each upstream product (product supplied from another supplier positioned immediately upstream) used per production volume of the product will hereinafter be referred to as "second information".

As described above, the traceability-related information in the product information includes the first information and the second information. Inventory data serving as a substitute for the first information can be predetermined depending on, for example, the type of a target incorporated product. However, it is difficult to estimate an upstream product to be used and the amount of use of the upstream product for the production of the target incorporated product. Therefore, it may be difficult to determine the inventory data on the second information depending on, for example, the type of the incorporated product. In the present embodiment, the inventory data serving as a substitute for the first information is stored in the database of the storage unit 12, but the inventory data serving as a substitute for the second information is not stored.

Registration Request Process

Next, the registration request process according to the present embodiment will be described. In the present embodiment, details of the notification to be sent to the second supplier are changed depending on the traceability item for which data is not registered in the product information on the unregistered product. Specifically, when the second information is not registered in the product information on the unregistered product, the control unit 11 notifies the second supplier to request the first supplier to register the second information in the storage unit 12. When the second information is registered but the first information is not registered in the product information on the unregistered product, the control unit 11 notifies the second supplier to request the first supplier to register the first information or the inventory data serving as a substitute for the first information (hereinafter sometimes referred to as "first inventory data") in the storage unit 12.

As described above, the first inventory data is stored in the database of the storage unit 12. By accessing the database of the storage unit 12 via the company terminal 2, the first supplier can acquire the first inventory data associated with the in-house incorporated product from the database. Therefore, the first supplier can register the first inventory data even if the first supplier has difficulty in registering the first information in the product information on the in-house incorporated product.

Processing Flow

Figures 14, 15:
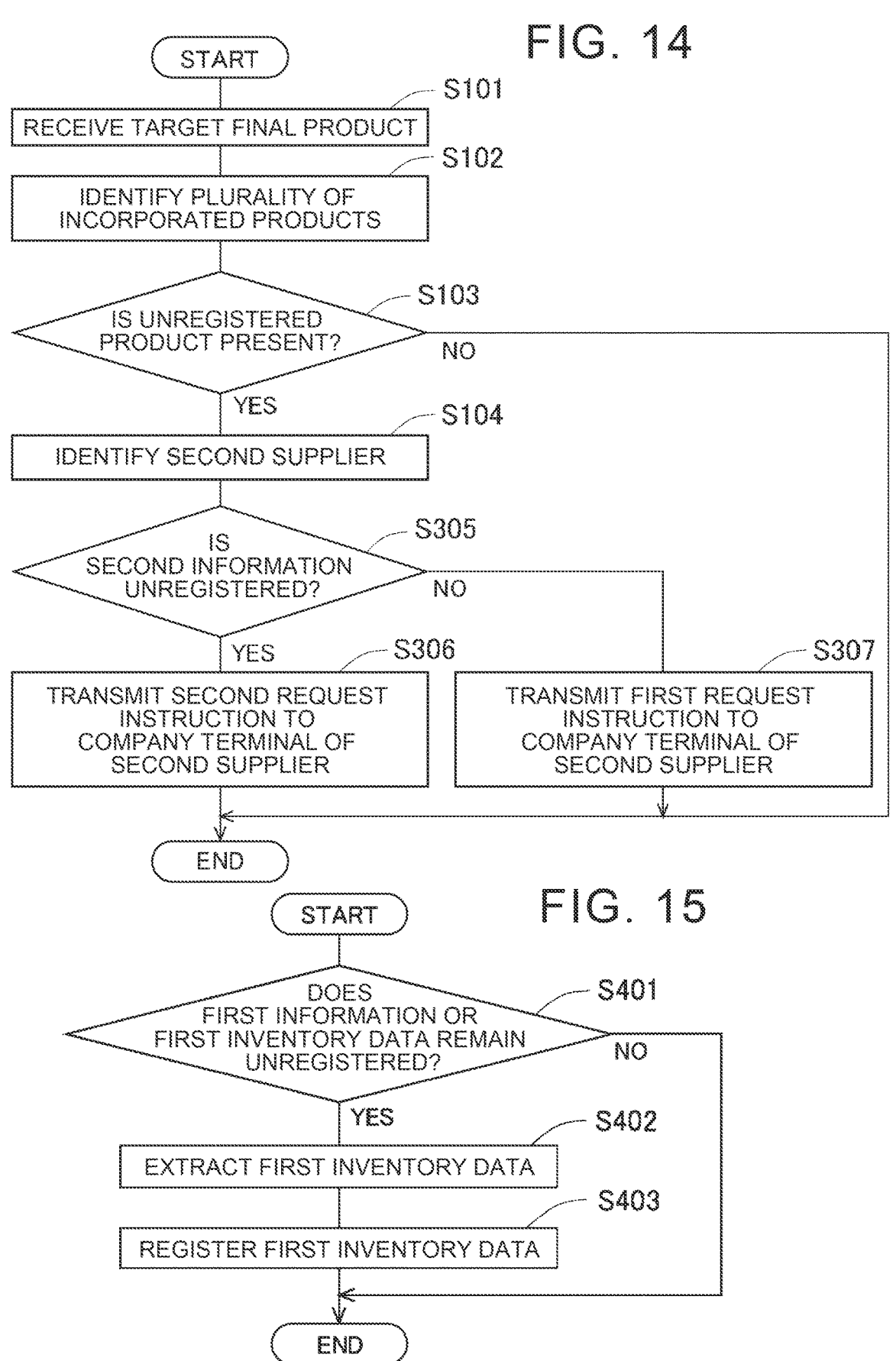
FIG. 14 shows a registration request process according to a second embodiment.
FIG. 15 shows an inventory data registration process according to the second embodiment.

A flow of the registration request process to be executed by the server device 1 will be described below with reference to FIG. 14. FIG. 14 shows the registration request process according to the present embodiment. The process from S101 to S104 in the processing flow shown in FIG. 14 is the same as the process of the steps with the same reference numerals in the processing flow shown in FIG. 12. Therefore, description of the process from S101 to S104 will be omitted.

In the registration request process shown in FIG. 14, the request notification unit 116 determines, in S305 subsequent to S104, whether the unregistered traceability item in the product information on the unregistered product is the second information (i.e., whether the second information is unregistered). When the determination result is "YES" in S305, a process of S306 is executed. In S306, the request notification unit 116 transmits a second request instruction to the company terminal 2 of the second supplier identified in S104. The second request instruction is instruction information for requesting the first supplier to register the second information on the unregistered product in the product information (product information stored in the storage area of the storage unit 12). In S306, the request notification unit 116 may output the second request instruction to the account of the second supplier.

When the determination result is "NO" in S305, that is, when the second information is registered but the first information is not registered in the product information on the unregistered product, a process of S307 is executed. In S307, the request notification unit 116 transmits a first request instruction to the company terminal 2 of the second supplier identified in S104. The first request instruction is instruction information for requesting the first supplier to register the first information or the first inventory data on the unregistered product in the product information. In S307, the request notification unit 116 may output the first request instruction to the account of the second supplier.

In the registration request process described above, when the second information is not registered in the product information on the unregistered product, the second supplier is notified to request the first supplier to register the second information in the storage area of the storage unit 12. When the second supplier requests the first supplier to register the second information in the product information as a result of the notification, the first supplier can be prompted to register the second information. When the second information is registered but the first information is not registered in the product information on the unregistered product, the second supplier is notified to request the first supplier to register the first information or the first inventory data in the product information. When the second supplier requests the first supplier to register the first information or the first inventory data in the product information as a result of the notification, the first supplier can be prompted to register the first information or the first inventory data. With the registration request process according to the present embodiment as well, it is possible to facilitate the collection of pieces of information on the predetermined traceability item about the incorporated products incorporated in the final product X.

Inventory Data Registration Process

As described above, in the present embodiment, the second supplier requests the first supplier to register the first information or the first inventory data in the product information in response to reception of the first request instruction from the server device 1. In the present embodiment as well, even when the first supplier receives such a registration request from the second supplier, the first supplier does not always register the first information or the first inventory data in the product information for every unregistered product. That is, the first information on the unregistered product may remain unregistered in the storage area of the storage unit 12 even after the registration request process is executed by the server device 1.

In such a case, the control unit 11 registers the first inventory data on the unregistered product in the product information on the unregistered product stored in the storage unit 12. Thus, it is possible to execute the process of integrating the pieces of traceability-related information by using the first inventory data as data on the first information on the unregistered product.

Processing Flow

A flow of the inventory data registration process to be executed by the server device 1 will be described below with reference to FIG. 15. FIG. 15 shows the inventory data registration process according to the present embodiment.

When the second supplier requests the first supplier to register the first information or the first inventory data in the product information, information indicating completion of execution of the registration request is transmitted from the company terminal 2 of the second supplier to the server device 1. The server device 1 executes the process shown in FIG. 15 after a predetermined period has elapsed since the information indicating completion of execution of the registration request was received from the company terminal 2 of the second supplier.

In the inventory data registration process shown in FIG. 15, the control unit 11 of the server device 1 first determines in S401 whether the first information or the first inventory data on the unregistered product remains unregistered in the product information stored in the storage unit 12. When the determination result is "NO" in S401, that is, when the first information or the first inventory data on the unregistered product has already been registered, the execution of the process shown in FIG. 15 is terminated.

When the determination result is "YES" in S401, a process of S402 is executed. In S402, the control unit 11 extracts the first inventory data on the unregistered product from the database of the storage unit 12. In S403, the control unit 11 registers the first inventory data extracted in S402 in the field for registration of the traceability-related information in the product information on the unregistered product stored in the storage unit 12.

First Modification

In each of the above embodiments, the storage unit 12 of the server device 1 includes the storage area that stores the product information on each incorporated product and the database that stores the inventory data, but they may be provided in different storage devices. For example, the database that stores the inventory data may be provided in a server device different from the server device 1 and accessible to the server device 1 and the company terminal 2 of each supplier. Further, the company terminal 2 of each supplier may include the database that stores the inventory data.

Second Modification

In each of the above embodiments, the method for holding the information on the product tree (linking information of each company including the termination flag) may be changed as desired. In another example, a storage area shared among all the companies may be provided in the server device 1 (storage unit 12), and the linking information of each company may be held in the storage area shared among all the companies. In still another example, the dedicated storage area of each company may include a non-encrypted area, and the linking information of each company may be stored in the non-encrypted area of the dedicated storage area of each company. Alternatively, the linking information of each company may be held in an encrypted area of the dedicated storage area of each company. As long as the linking relationships of the product tree can be traced on the system, the configuration and the holding format of the linking information are not particularly limited and may be selected as appropriate depending on embodiments. The pieces of information on the product tree may be held collectively, or may be held separately, for example, by being included in the pieces of product information of the companies. When the product information of each company is held in the company terminal 2 of each company, the linking information of each company may be held in the company terminal 2 of each company.

Third Modification

In each of the above embodiments, the access limitation on each company is implemented by providing the dedicated storage area and the shared storage area. However, the method for implementing the access limitation is not limited to such an example, and any method may be used for the implementation.

Fourth Modification

In each of the above embodiments, the storage area of each company may be constructed by any database technology. In one example, the storage area of each company may be constructed by blockchain infrastructure. In this case, at least a part of the information processing related to the registration may be executed by smart contracts.

OTHER EMBODIMENTS

The embodiments described above are merely illustrative, and the present disclosure may be modified as appropriate without departing from the spirit and scope of the present disclosure. The processes and means described in the present disclosure can be combined as desired as long as no technical contradiction occurs.

The process described as being executed by a single device may be executed by a plurality of devices in cooperation. Alternatively, the process described as being executed by different devices may be executed by a single device. In a computer system, the hardware configuration (server configuration) that implements functions can be changed flexibly.

The present disclosure may be embodied such that a computer program that implements the functions described in the above embodiments is supplied to a computer and is read and executed by one or more processors of the computer. The computer program may be provided to the computer by being stored in a non-transitory computer-readable storage medium connectable to a system bus of the computer, or may be provided to the computer via a network. Examples of the non-transitory computer-readable storage medium include any type of disk or disc such as a magnetic disk (floppy (registered trademark) disk, hard disk drive (HDD), etc.) and an optical disc (compact disc ROM (CD-ROM), digital versatile disc (DVD), Blu-ray disc, etc.), and any type of medium suitable for storing electronic instructions, such as a read only memory (ROM), a random access memory (RAM), an EPROM, an electrically erasable programmable ROM (EEPROM), a magnetic card, a flash memory, and an optical card.

What is claimed is:

1. An information processing device comprising:
a first storage device configured to store pieces of product information on a plurality of incorporated products incorporated in a target product, the product information being registered by a supplier of each of the incorporated products;
a second storage device configured to store inventory data;
a linking unit configured to execute a process to generate product tree information based on a relationship of the stored pieces of product information;
a determination unit configured to actively determine registration of the product information of each of the plurality of incorporated products, wherein
in response to the determining that an unregistered incorporated product for which information on a predetermined traceability item is not registered in the product information stored in the first storage device is present, the product tree information is used to identify a first supplier of the unregistered incorporated product and a second supplier positioned immediately downstream of the first supplier in a supply chain defined by a plurality of suppliers,
the information on the predetermined traceability item includes first information and second information,
the first information is information obtained from a result of measurement performed by each supplier in-house about the predetermined traceability item,
the second information is information on an amount of use in an in-house product of each supplier about a product supplied from another supplier positioned immediately upstream of each supplier, and
the determination unit is further configured to determine whether the non-registered information on the predetermined traceability item associated with the unregistered incorporated product includes at least one of the first information and the second information;
a request notification unit configured to, in response to the determining that the non-registered information includes the second information, send to a terminal associated with the second supplier a notification to send a request to the first supplier to register the second information, wherein
in response to the determining that the second information is registered and the non-registered information includes the first information, the request notification unit is configured to send to the terminal associated with the second supplier a notification to send a request to the first supplier to register the first information;
an input/output device configured to receive, from the second supplier, a completion of execution of the registration request; and
an information providing unit configured to execute a process for calculating a value of the predetermined traceability item of the target product, wherein
when a time period since receiving of the completion of execution of the registration request is at least equal to a predetermined period, the inventory data corresponding to the determined non-registered first information or non-registered second information is extracted from the second storage device, the extracted inventory data is used as substitute data such that the non-registered first information or the non-registered second information is registered using the corresponding substitute data, the value of the predetermined traceability item of the target product is calculated based on the registered first information and/or the registered second information, and the input/output device displays the determined value of the predetermined traceability item in a user interface.

2. The information processing device according to claim 1, wherein the registration request to the first supplier to register the non-registered first information or the non-registered second information includes a request to register the corresponding inventory data serving as the substitute data for the non-registered first information or the non-registered second information.

3. The information processing device according to claim 1, wherein the linking unit is configured to:

interact with a plurality of terminals to acquire the product tree information indicating relationships among the incorporated products incorporated in the target product.

4. The information processing device according to claim 1, wherein the predetermined traceability item includes a carbon footprint of products, a recycling rate related to a predetermined raw material, or a score related to due diligence.

5. An information processing method to be executed by an information processing device, the information processing method comprising:

storing, in a first storage device, pieces of product information on a plurality of incorporated products incorporated in a target product, the product information being registered by a supplier of each of the incorporated products;

storing, in a second storage device, inventory data;

executing a process, by a linking unit, to generate product tree information based on a relationship of the stored pieces of product information;

actively determining, by a determination unit, registration of the product information of each of the plurality of incorporated products, wherein in response to the determining that an unregistered incorporated product for which information on a predetermined traceability item is not registered in the product information stored in the first storage device is present, the product tree information is used to identify a first supplier of the unregistered incorporated product and a second supplier positioned immediately downstream of the first supplier in a supply chain defined by a plurality of suppliers, the information on the predetermined traceability item includes first information and second information, the first information is information obtained from a result of measurement performed by each supplier in-house about the predetermined traceability item, and the second information is information on an amount of use in an in-house product of each supplier about a product supplied from another supplier positioned immediately upstream of each supplier;

determining, by the determination unit, whether the non-registered information on the predetermined traceability item associated with the unregistered incorporated product includes at least one of the first information and the second information;

sending, by a request notification unit, in response to the determining that the non-registered information includes the second information, to a terminal associated with the second supplier a notification to send a request to the first supplier to register the second information, wherein in response to the determining that the second information is registered and the non-registered information includes the first information, the request notification unit is configured to send to the terminal associated with the second supplier a notification to send a request to the first supplier to register the first information;

receiving, by an input/output device, from the second supplier, a completion of execution of the registration request;

executing a process, by an information providing unit, to calculate a value of the predetermined traceability item of the target product, wherein when a time period since receiving of the completion of execution of the registration request is at least equal to a predetermined period, the inventory data corresponding to the determined non-registered first information or non-registered second information is extracted from the second storage device, the extracted inventory data is used as substitute data such that the non-registered first information or the non-registered second information is registered using the corresponding substitute data, and the value of the predetermined traceability item of the target product is calculated based on the registered first information and/or the registered second information; and displaying, by the input/output device, the determined value of the predetermined traceability item in a user interface.

6. The information processing method according to claim 5, wherein the registration request to the first supplier to register the non-registered first information or the non-registered second information includes a request to register the corresponding inventory data serving as the substitute data for the non-registered first information or the non-registered second information.

7. The information processing method according to claim 5, further comprising:

interacting with a plurality of terminals to acquire the product tree information indicating relationships among the incorporated products incorporated in the target product.

8. The information processing method according to claim 5, wherein the predetermined traceability item includes a carbon footprint of products, a recycling rate related to a predetermined raw material, or a score related to due diligence.

9. An information processing system comprising:

an information processing device including a first storage device configured to store pieces of product information on a plurality of incorporated products incorporated in a target product, the product information being registered by a supplier of each of the incorporated products; and a plurality of terminals associated with the suppliers of the incorporated products, wherein the information processing device further comprises:

a second storage device configured to store inventory data;

a linking unit configured to execute a process to interact with the plurality of terminals to acquire the stored pieces of product information and generate product tree information based on a relationship of the stored pieces of product information;

a determination unit configured to actively determine registration of the product information of each of the plurality of incorporated products, wherein in response to the determining that an unregistered incorporated product for which information on a predetermined traceability item is not registered in the product information stored in the first storage device is present, the product tree information is used to identify a first supplier of the unregistered incorporated product and a second supplier positioned immediately downstream of the first supplier in a supply chain defined by a plurality of suppliers, the information on the predetermined traceability item includes first information and second information, the first information is information obtained from a result of measurement performed by each supplier in-house about the predetermined traceability item, the second information is information on an amount of use in an in-house product of each supplier about a product supplied from another supplier positioned immediately upstream of each supplier, and the determination unit is further configured to determine whether the non-registered information on the predetermined traceability item associated with the unregistered incorporated product includes at least one of the first information and the second information;

a request notification unit configured to, in response to the determining that the non-registered information includes the second information, send to the terminal associated with the second supplier a notification to send a request to the first supplier to register the second information, wherein in response to the determining that the second information is registered and the non-registered information includes the first information, the request notification unit is configured to send to the terminal associated with the second supplier a notification to send a request to the first supplier to register the first information;

an input/output device configured to receive, from the second supplier, a completion of execution of the registration request; and an information providing unit configured to execute a process for calculating a value of the predetermined traceability item of the target product, wherein when a time period since receiving of the completion of execution of the registration request is at least equal to a predetermined period, the inventory data corresponding to the determined non-registered first information or non-registered second information is extracted from the second storage device, the extracted inventory data is used as substitute data such that the non-registered first information or the non-registered second information is registered using the corresponding substitute data, the value of the predetermined traceability item of the target product is calculated based on the registered first information and/or the registered second information, and the input/output device displays the determined value of the predetermined traceability item in a user interface.

* * * * *